United States Patent
Degarate et al.

(10) Patent No.: US 9,016,167 B2
(45) Date of Patent: Apr. 28, 2015

(54) INTEGRATED HAND AND CONTROLS PROTECTION SYSTEM

(76) Inventors: Paul Degarate, Niwot, CO (US); Paul Davidovich, Lyons, CO (US); Rodney A. Brenneman, San Juan Capistrano, CA (US)

(*) Notice: Subject to any disclaimer, the term of this patent is extended or adjusted under 35 U.S.C. 154(b) by 1256 days.

(21) Appl. No.: 11/957,105

(22) Filed: Dec. 14, 2007

(65) Prior Publication Data
US 2008/0141821 A1 Jun. 19, 2008

Related U.S. Application Data

(60) Provisional application No. 60/870,343, filed on Dec. 15, 2006, provisional application No. 61/013,637, filed on Dec. 13, 2007.

(51) Int. Cl.
| B62K 11/14 | (2006.01) |
| B62J 23/00 | (2006.01) |
| B62J 29/00 | (2006.01) |
| B62K 21/12 | (2006.01) |

(52) U.S. Cl.
CPC ............... *B62K 11/14* (2013.01); *B62J 23/00* (2013.01); *B62K 21/12* (2013.01)

(58) Field of Classification Search
CPC ....... B62K 21/125; B62K 21/12; B62J 29/00; B62J 23/00; B62J 17/00; B62J 17/02; B60R 1/006; B60R 1/06
USPC ............ 74/551.8, 551.9, 551.3, 551.4, 551.5, 74/551.6, 551.1; 359/842; 296/78.1, 1.11; 248/479, 481, 487, 230.1, 74.1, 316.1; 280/288.4; D12/114, 110

IPC ................................ B62J 29/00,23/00
See application file for complete search history.

(56) References Cited

U.S. PATENT DOCUMENTS

| 2,455,919 | A | * | 12/1948 | Daon | 248/482 |
| 2,903,297 | A | * | 9/1959 | Zbikowski | 248/479 |
| 3,338,545 | A | * | 8/1967 | Magi | 248/481 |
| 3,834,249 | A | * | 9/1974 | Bothwell | 74/551.8 |
| 4,032,168 | A | * | 6/1977 | Emerson | 74/551.1 |
| 4,054,375 | A | * | 10/1977 | Ribeca | 359/842 |
| 4,252,290 | A | * | 2/1981 | Willey | 248/549 |
| 4,433,899 | A | * | 2/1984 | Sellet et al. | 359/842 |
| 4,605,289 | A | * | 8/1986 | Levine et al. | 359/842 |
| 4,645,316 | A | * | 2/1987 | Ohyama | 248/481 |
| 4,715,681 | A | * | 12/1987 | Johnson | 359/842 |
| 4,906,086 | A | * | 3/1990 | Imai et al. | 296/78.1 |
| 5,285,696 | A | * | 2/1994 | Taylor | 74/551.1 |
| 5,487,497 | A | * | 1/1996 | Kwiatkowski | 224/420 |
| 5,522,527 | A | * | 6/1996 | Tsai | 224/420 |
| 5,832,786 | A | * | 11/1998 | Risley | 74/551.8 |
| 6,036,160 | A | * | 3/2000 | Shimokobe et al. | 248/483 |
| 6,953,201 | B1 | * | 10/2005 | VanDeMortel | 74/551.2 |

(Continued)

FOREIGN PATENT DOCUMENTS

| EP | 936135 A2 * 8/1999 |
| JP | 58049538 A * 3/1983 |

(Continued)

*Primary Examiner* — Daniel Yabut

(57) ABSTRACT

Integrated hand and controls protection system for vehicles utilizing handlebars for steering, consisting of; hand/controls guards (guards), integral/stowable mirror assembly, damper mount, display guard and integral electrical accessory mounting provisions.

3 Claims, 7 Drawing Sheets

(56) References Cited

U.S. PATENT DOCUMENTS

| | | | |
|---|---|---|---|
| 2003/0107826 A1* | 6/2003 | Shafrir et al. | 359/841 |
| 2003/0177857 A1* | 9/2003 | Chuang | 74/551.8 |
| 2004/0134304 A1* | 7/2004 | Wu | 74/551.8 |
| 2004/0217243 A1* | 11/2004 | Laivins et al. | 248/230.1 |
| 2005/0040621 A1* | 2/2005 | Paris et al. | 74/551.1 |
| 2005/0237643 A1* | 10/2005 | Wu | 359/871 |
| 2006/0208522 A1* | 9/2006 | Gray et al. | 296/78.1 |
| 2007/0039408 A1* | 2/2007 | Laivins et al. | 74/551.8 |
| 2007/0137409 A1* | 6/2007 | Laivins et al. | 74/551.1 |

FOREIGN PATENT DOCUMENTS

| | | | |
|---|---|---|---|
| JP | 08198159 A | * | 8/1996 |
| JP | 10157680 A | * | 6/1998 |
| JP | 2002029479 A | * | 1/2002 |

* cited by examiner

INTEGRATED HAND AND CONTROLS PROTECTION SYSTEM

RELATED APPLICATION

This is a non-provisional application of provisional patent application Ser. Nos. 60/870,343, Filed on 15 Dec. 2006, titled "Integrated control accessories and protection" and Ser. No. 61/013,637, filed on 13 Dec. 2007, titled "Integrated hand and controls protection system", and claims priority to said provisional applications, and fully incorporates theirs specification and drawings by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The invention relates to hands/controls protection and accessories mounting on vehicles utilizing handlebars for steering systems.

2. The Description of Related Art

There are many upgrade options available to tailor/improve the utility of vehicles, particularly off-road/dual sport motorcycles. Popular upgrades include, but are not limited to; hand/control guards and fairings, lighting and lighting controls, mirrors and mounts, auxiliary switch mounts, information displays, steering dampers, and handlebar stiffeners. Currently these utility upgrades are principally stand-alone units that generally mount directly to the handlebars with their unique clamping devices. The stand-alone systems are competing with scarce mounting surface available on the vehicle handlebars, which limits potential upgrades. In practice, many operators adjust handlebar clamps to allow mounted controls and/or handlebars to rotate in event of impact rather than bend or fracture. Existing guard designs incorporate simple bars with limited impact coverage and rigid mounting provisions, which restrict adjustment for rider preference and do not incorporate damage limiting energy attenuating features in event of minor impact and generally absorb impact energy through permanent deformation of components. Other guard implementations allow guards to rotate, with limited constraint, on some impacts and may compromise protection and safety. Existing rear view mirror designs are cumbersome, prone to damage and provide degraded reflected images particularly in high vibration environments. Other mirror implementations are fixed non-adjustably to a fairing or provide a simple single rotational degree of freedom, preventing full line of sight adjustment. Existing handlebar to vehicle steering assembly attachment clamps are make and model specific or simple assemblies without features facilitating utility upgrades.

U.S. Pat. No. 3,832,912 (September 1974, Edwards) presents a simple hand guard with inboard attachment by means of a dedicated clamp on the handlebar. U.S. Pat. No. 4,141,567 (February 1979, Scott) presents protective fairings cantilevered off various configurations of controls clamped to handlebars. U.S. Pat. No. 4,438,661 (March 1984, Cullen) presents simple formed guard with inboard attachment by means of a dedicated clamp on the handlebar. Design Pat. Des 319,992 (September 1991, Acerbis) presents fairings that are clamped to the handlebars. U.S. Pat. No. 6,805,023 (October 2004, Greetis) presents replacement handlebars that integrate mountings and protect cabling for steering mounted controls. Patent application US 2004/0217243 (February 2005, Laivins) presents a universal clamp for inboard attachment of hand guards to the handlebars. Patent application US 2005/0040621 (February 2005, Paris) present a fixed position upper bar clamp guard attachment with integral damper mount.

BRIEF SUMMARY OF THE INVENTION

The invention, integrated controls accessories and protection, provides a system that integrates hand/controls guards, mirror and accessory mounting provisions into a multi-function unit that help alleviate the clutter and allow improved functionality, reduced parts count and weight impact versus current implementations. Shaping of the hand/control guard increases impact coverage and is provided with a fitted fairing to further improve comfort and protection. Additionally, shaping of the guards provides: increased diameter of guard bar end to enhance finish and provide protection for control grips, offset below the bar end/grip protector to allow improved mirror deployment, and a boss for mounting front turn signals or auxiliary lighting. The hand/control guard incorporates an integrated fully adjustable rear view mirror assembly that can be securely stowed and fully protected behind the hand/control guard when not needed. The fully adjustable mirror may be attached preferably to the guard or guard fairing. Inboard attachment of the hand/control guard is provided with multiple slotted apertures, which allows guard to be fastened to the swivel boss for handlebars of varying widths. The swivel boss attaches to a threaded aperture in the side face of the upper handlebar clamp, which allows for greater adjustment of guard position relative to handlebars upon installation. Additionally, the swivel boss and upper handlebar clamp incorporates a hard stop, which allows limited energy attenuation in event of impact while still offering essential protection by limiting overall rotation. Upper handle bar clamps are provided with integral mounting provisions to allow integrating other equipment: modular information display guards, steering dampers, turn signals/auxiliary lighting, auxiliary switches, etc.

DETAILED DESCRIPTION OF THE INVENTION

Figure 1:
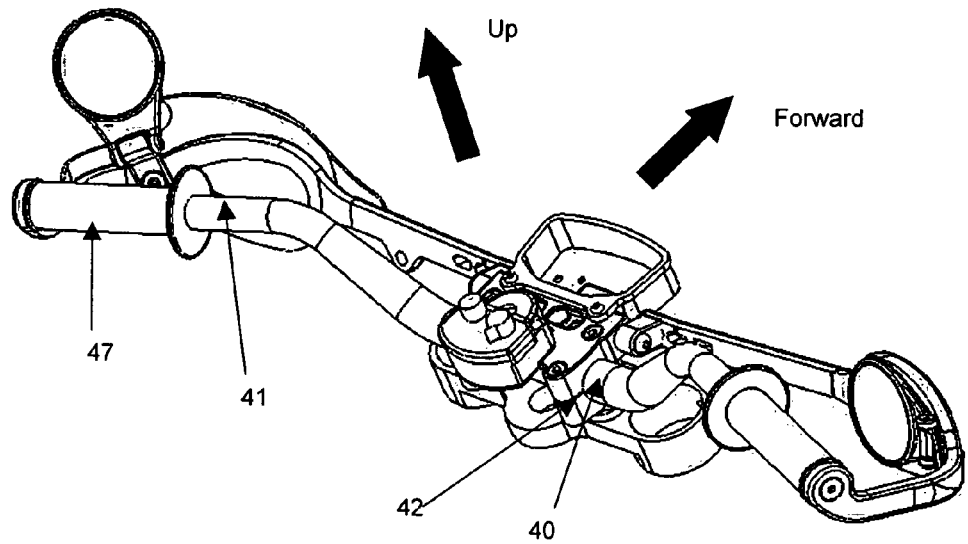
FIG. 1 is an overview of the invention shown mounted on motorcycle handlebars, looking generally forward. View depicts one mirror stowed and the other deployed. Additionally, the left hand guard depicts fairing incorporated.
Figure 2:
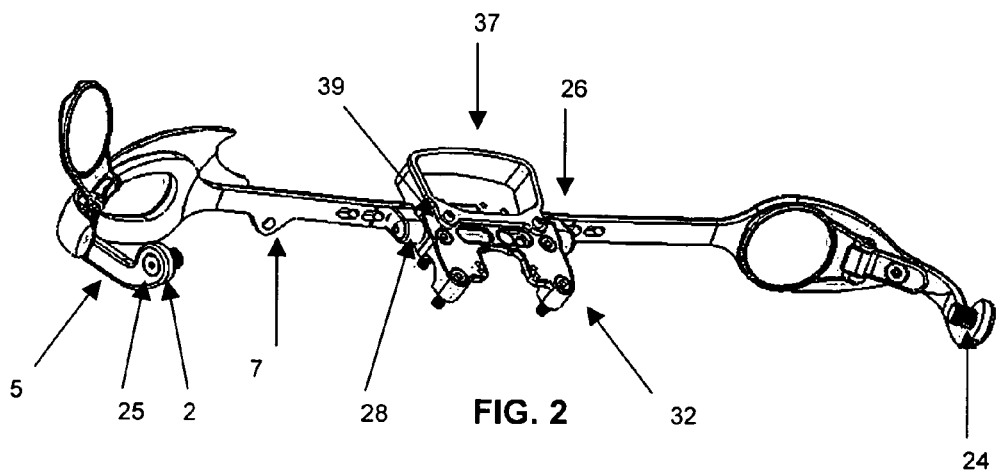
FIG. 2 shows perspective view of invention applicable to this application.
Figure 3:
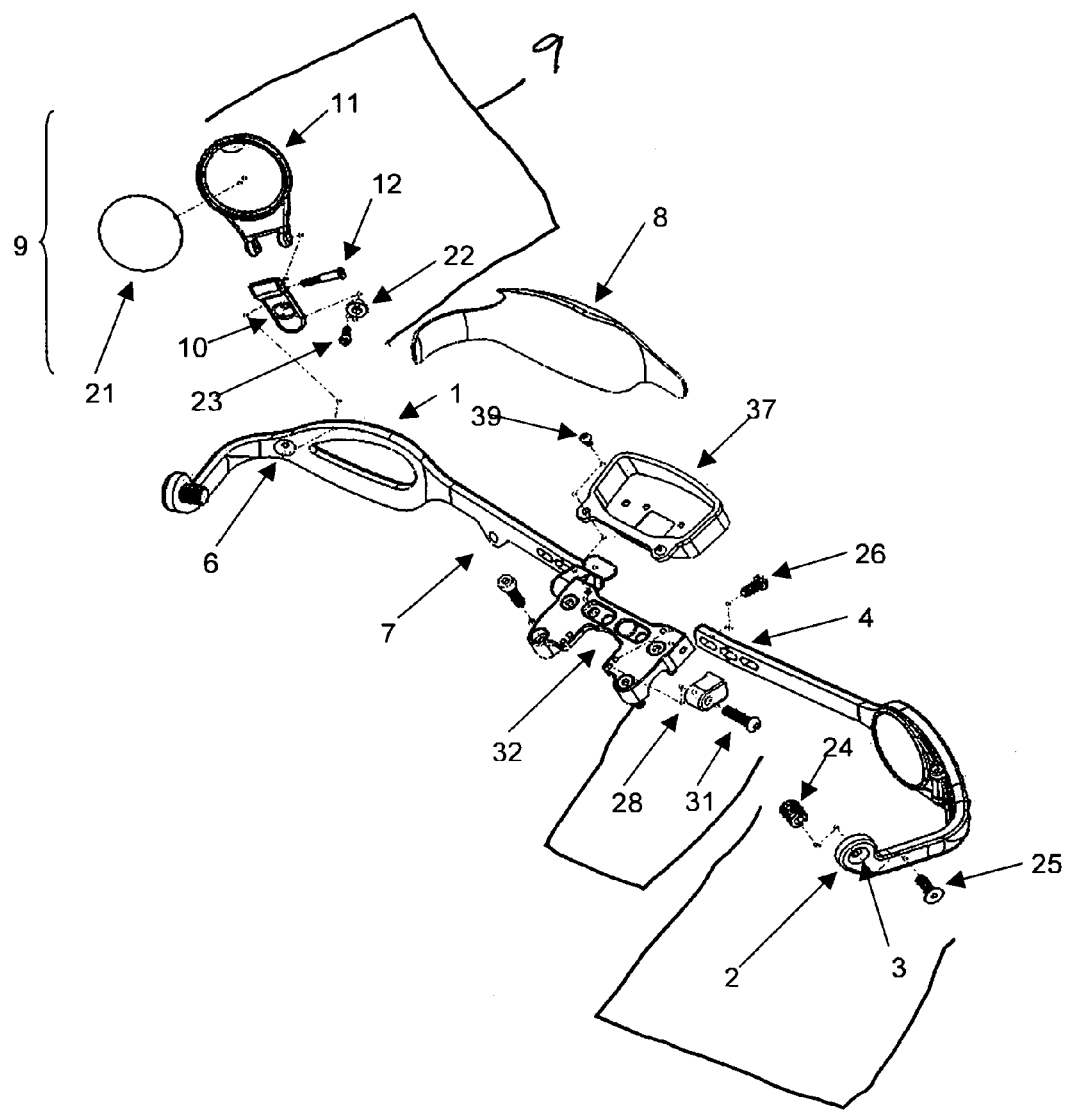
FIG. 3 is an exploded view of items that form the invention of this application.
Figure 4:
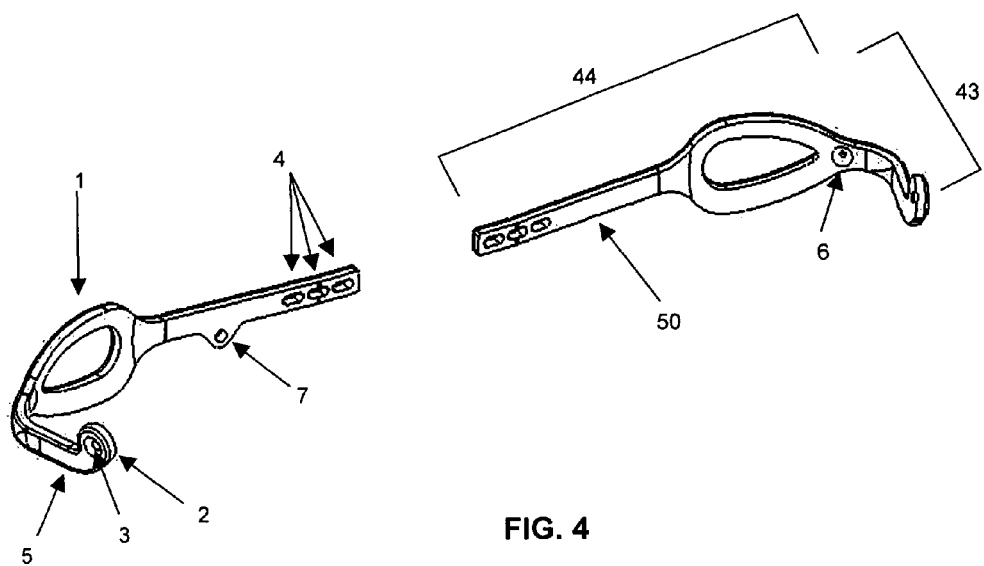
FIG. 4 is a detail of the hand/controls guard.
Figure 5:
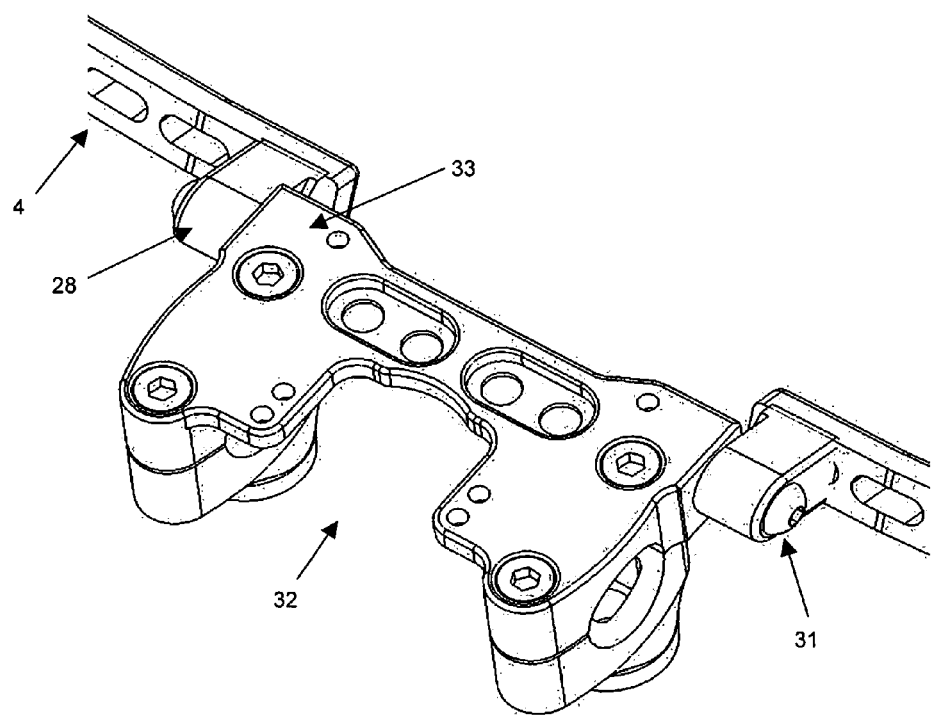
FIG. 5 is a detailed view of the inboard portion of the guard showing swivel boss and depiction of limit stop against upper bar clamp assembly.
Figure 6:
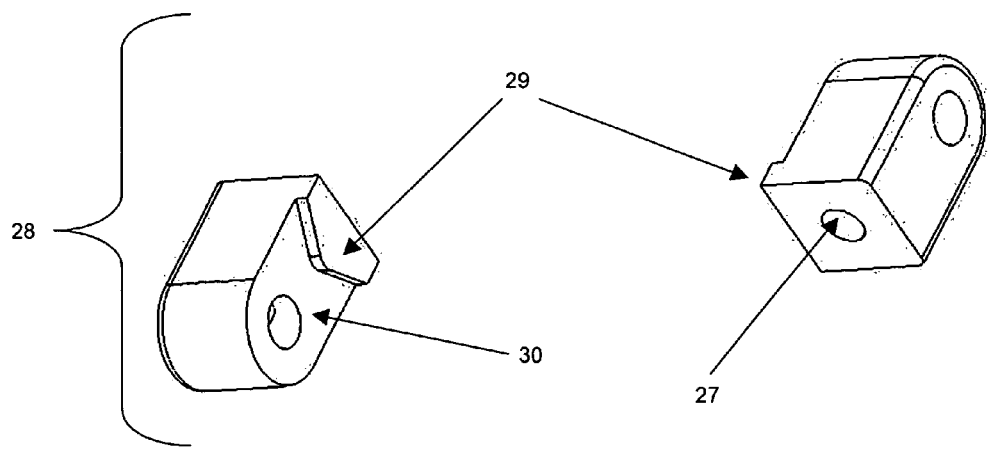
FIG. 6 shows details of the swivel boss.
Figure 7:
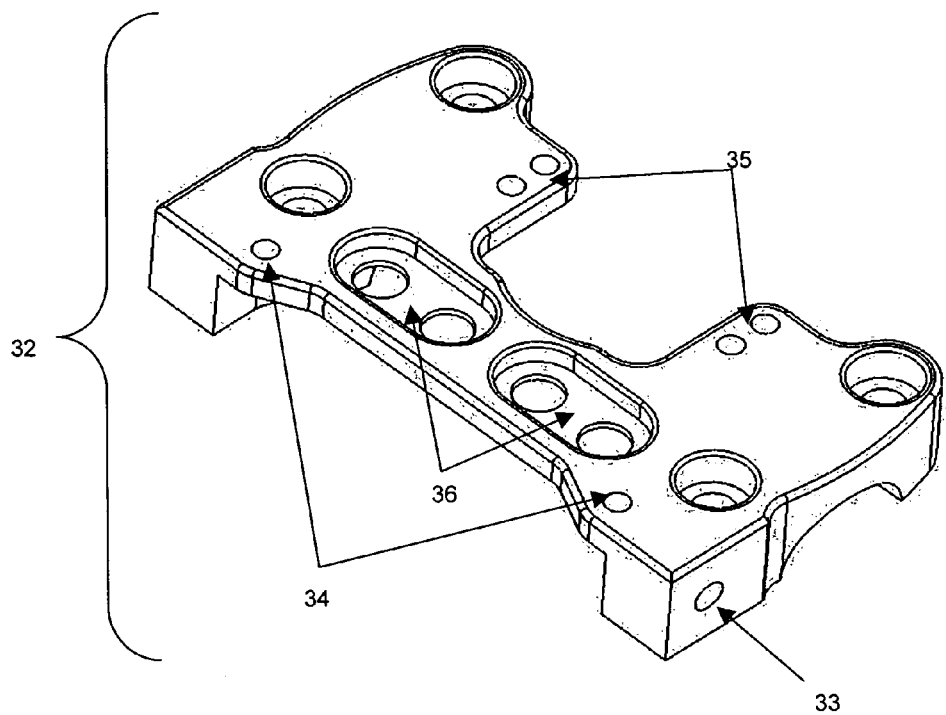
FIG. 7 shows details of the upper bar clamps and modular display mount guards.
Figure 8:
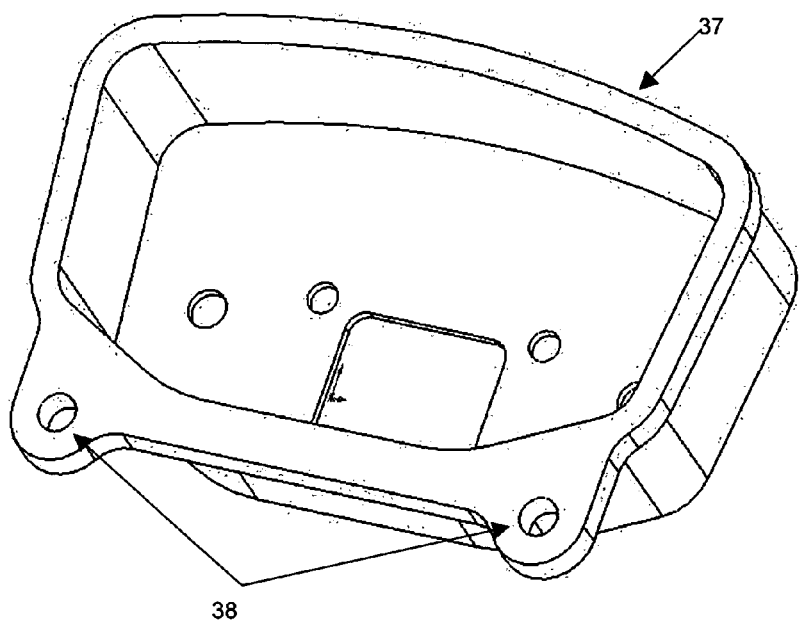
FIG. 8 shows details of a typical modular display guard.
Figure 9:
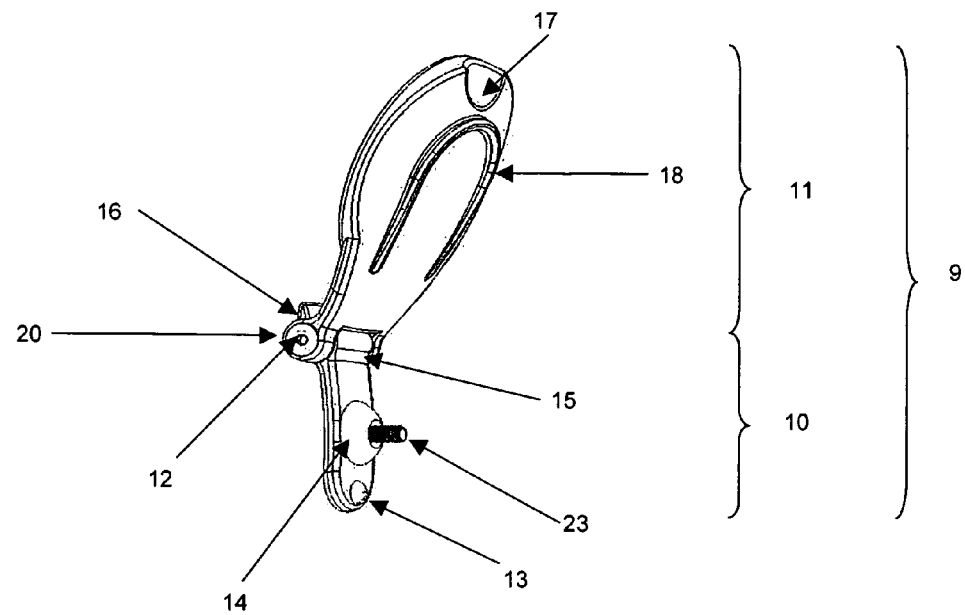
FIG. 9 shows details of the mirror assembly.
Figure 10:
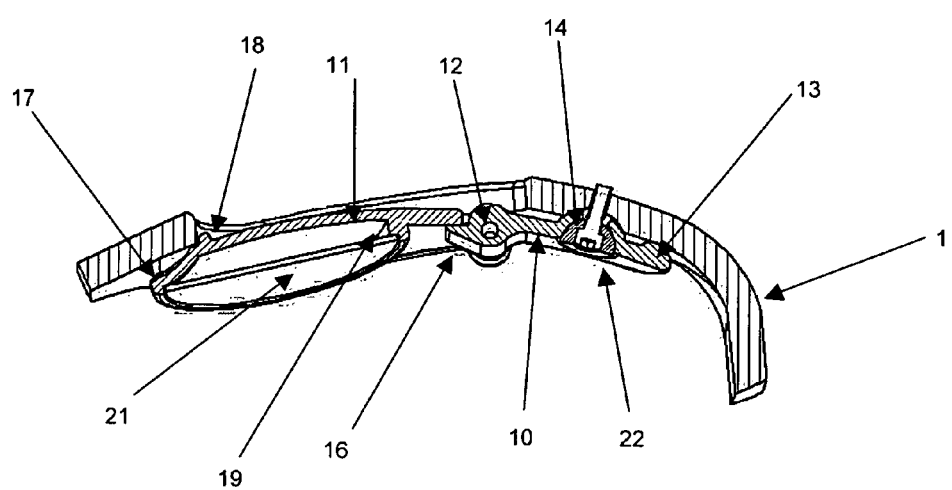
FIG. 10 is a cross section detailing the mirror assembly in the stowed position.
Figure 11:
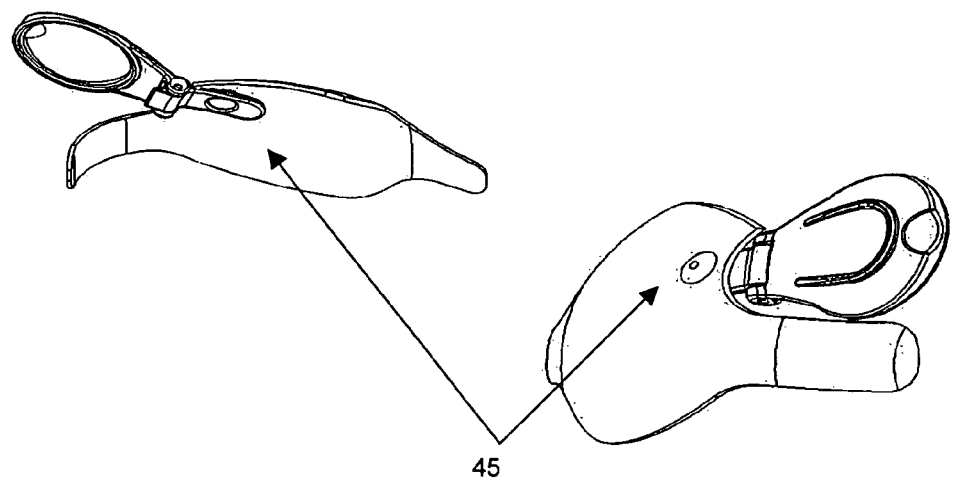
FIG. 11 is a view of the mirror assembly mounted on a fairing.
Figure 12:
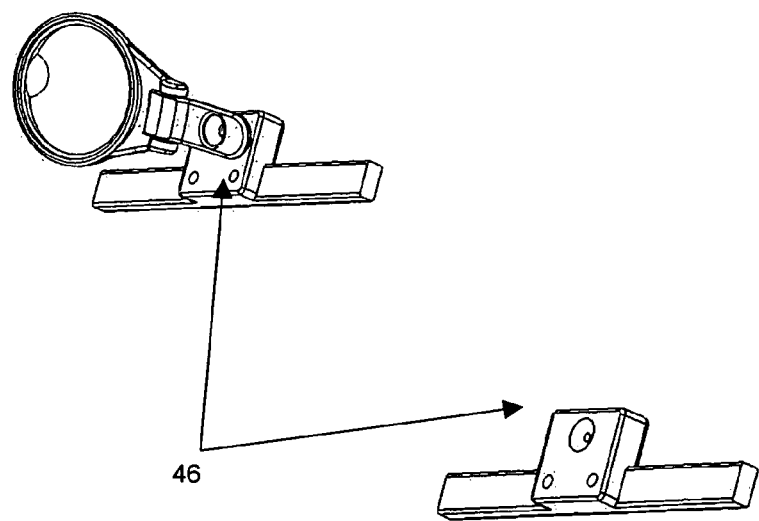
FIG. 12 is a view of the mirror assembly mounted on a guard by means of an adapter plate.

The system provides hand/controls protection and accessories mounting provisions for vehicle using handlebars for steering and operation control mounting. The handlebar is essentially comprised of a middle portion (40) and two distal handgrip portions (41). The handlebar grip (47) is mounted to the handgrip distal end of the handlebars. The handlebar bottom clamps (42), comprising a lower portion of which is securely fastened to a vehicle steering assembly, an upper portion being sized and shaped to accept substantially half of the lower middle portion of the handlebar. Handlebar top clamps, comprising a lower portion being sized and shaped to accept substantially half of the upper middle portion of the handlebar are coupled to the bottom clamps to fix the handlebars to the steering assembly that may be combined into a one piece clamp (32).

Hand/Controls Guard (1) is preferably manufactured from billet and formed into curved/concave final contour, or may be injected molded of chopped fiber reinforced plastic. The hand guard (1), is comprised a shorter portion (43) with a nominal cross-section at (5) and (50) and a longer portion (44), generally "L" shaped, the shorter portion (42) containing an aperture (3) on one end being rotatably attached to the distal end of the handlebar (41), the longer portion (44) may vary substantially in cross-section which may contain at least one area of 3 dimensional concavity, which may contain an aperture at (1) as it extends inwardly toward the handlebar top clamp substantially parallel to the handlebar. Guard incorporates; enlarged bar end/grip protector (2) large enough to protect the grip and controls from damage in an impact, bar end fastener aperture (3), and inboard fastener slotted/apertures (4) for mounting to motorcycle upper handlebar clamps via swivel blocks (28). The guard is offset below the bar end/grip protector to allow improved mirror deployment at (5). Hemispherical lead-in with tapped aperture (6), preferably on the guard, provides adjustable mounting for the fully adjustable and stow able mirror assembly. Integral light boss with aperture (7) provides mounting provision for turn signals or auxiliary lighting.

Fairing (8) is preferably injection molded to nest/conform to guard contour and provides extended protection from debris and adverse weather exposure.

Mirror assembly (9) is, preferably, comprised of a mount base (10) hinged to the mirror base (11). Hinge pin fastener (12) acts as the mirror assembly hinge pin and hinge friction adjuster. The preferably injection molded mirror assembly (9) is, preferably, shaped and the thickness contoured to provide stability during operation and to securely nest within the guard when stowed. Rotation limit stop (13), hemispheric boss (14), mount base hinge half (15) and hinge limit stop (16) are integrated in the, preferably, injection molded mount base (10). Spherical sector shaped finger pull (17), nesting lock bead (18), mirror pocket (19) and mirror base hinge half (20) are integrated in the, preferably, injection molded mirror base (11). Optical element (21) is bonded into the mirror pocket (19). Entire assembly is typically mounted to the guard or fairing using hemispherical washer (22) and threaded fastener (23). Though the preferred embodiment of the mirror assembly mount is the integral provision of the hand guard, the mirror may alternately be mounted to a fairing with an integral hemispheric pocket (45), or to a hand guard by means of an adapter plate with an integral hemispheric pocket (46). Once desired friction is set a locknut may be used to further prevent undesired setting changes during operation.

Guard/handlebar attachment at each bar end preferably uses a threaded insert (24) in the handle bar end aperture. Fastener (25) passes through aperture in hand guard end and is threaded into the insert (24). Installation requires grip ends (by others) to be trimmed. The inboard attachment of the hand/control guard to the handlebar preferably uses fastener (26) through applicable guard fastener slotted aperture (4) into a threaded aperture (27) in the swivel boss (28). The swivel boss (28) incorporates rotation limit stops (29) and fastener through aperture (30). Swivel boss (28) preferably attaches, using fastener (31), to the side of the upper handlebar clamp (32) with an integral threaded aperture (33). Upper handlebar clamp (32) provides basic handlebar clamping and attachment to motorcycle steering assembly. Upper handlebar clamp assembly incorporates integral: modular information display guard mounting (34), steering damper mount (35) and auxiliary switch/indicator (36) mounting provisions, or various combinations of the accessory mount provisions. Typical modular information display guard (37) with common mounting boss with apertures (38), which allows attachment of various models of displays to the upper handlebar clamp using, threaded fasteners (39).

The system in all its variations, once installed, is a passive protective device. The hand guards are constructed with varied cross sections and compound bending that provide increased protective coverage and strength over conventional bar stock devices, while minimizing weight impact. The multiple slotted apertures allow convenient, tailored fit of the guards to handlebars of various stock or modified widths. Guard installation using swivel blocks allows the operator to adjust hand guard concentric to the long axis of the handlebars to preference. Friction at the swivel block mate to the stop boss of the upper handlebar clamp assembly provides limited energy attenuation in event of minor impact. Additionally, the swivel boss incorporates positive stops to resist over rotation. The mirror assembly mounted to the hand guard by means of a hemispherical pocket in the hand guard, a hemispherical boss integral to the mirror mount base and a hemispherical washer all concentrically fastened together to allow three rotational degrees of freedom. The rear view mirror assembly can be rotated between the stowed and deployed positions. The rotation limit stop and hinge stop work in concert to prevent mirror assembly motion toward controls due to aerodynamic loads. The rotation limit stop, hinge stop and locking bead all work in concert to securely nest the mirror assembly to the hand guard against inertial loads. A finger pull in the mirror base facilitates deployment from the stowed position, which requires elastic deformation of the mirror assembly to overcome the rotation stop/nesting bead fit. The mirror assembly significantly improves reflective image line of sight through deployed location at or beyond the handlebar end. When deployed the viewing direction is fully adjustable by the operator rotating mirror hemispheric boss and mirror hinge. The mirror assembly significantly improves reflective image in high vibration environment through three-dimensional shaping to provide stiffness.

While the invention has been described with reference to preferred embodiments, those skilled in the art will understand that various changes may be made and equivalents may be substituted for elements thereof without departing from the scope of the invention. It is intended that the invention not be limited to the particular embodiment disclosed as the best mode contemplated for carrying out this invention, but that the invention will include embodiments falling within the scope of the claims.

What is claimed is:

1. An integrated hand and controls protection system comprising:
    a handlebar, comprising a cylindrical middle portion defining an axis and two distal handgrip portions, the distal ends diverge from the middle portion axis in a generally rearward direction; and
    at least one handlebar bottom clamp, comprising a lower portion of which is securely fastened to a vehicle, an upper portion being sized and shaped to accept substantially half of the lower middle portion of said handlebar; and
    at least one handlebar top clamp, comprising a front portion and a side portion when fastened to the bottom clamp generally fixes the handlebar in position, a lower portion of said handlebar top clamp being sized and shaped to accept substantially half of the upper middle portion of said handlebar, said side portion of said handlebar top clamp containing an aperture, said front portion of said handlebar top clamp generally parallel to and forward of said handlebars; and
    a hand guard, comprising a shorter portion and a longer portion, generally "L" shaped, with a nominal cross-section, the shorter portion extending forward of the handlebar and containing an aperture on one end being rotatably attached to the distal end of said handlebar, the longer portion extends inwardly toward the handlebar top clamp substantially parallel to said handlebar, the end of the longer portion containing an aperture, and
    a swivel boss, comprising a front portion and a side portion, said front portion containing an aperture configured to attach to said aperture of the longer portion of said hand guard, said side portion containing an aperture configured to be rotatably attached to the aperture on the side of said handlebar top clamp; and
    a mirror assembly, comprising a mirror base and a mount base, said mirror base containing an end configured to receive an optical element, said mount base containing an aperture configured to attach to said hand guard, which when mounted to said hand guard rotates from a position behind said hand guard for protection to a position beyond said hand guard and said handlebar for use.

2. The hand guard of claim 1, wherein the hand guard contains a hemispherical pocket, mounting said mirror assembly of claim 1 with a hemispherical boss and a concentric hemispherical pocket integral to said mirror assembly of claim 1, with a hemispherical washer to all concentrically fasten together to allow three rotational degrees of freedom.

3. The mirror assembly of claim 1, which provides increased adjustability by incorporating a hinged joint between said mirror base and said mount base of the mirror assembly.

* * * * *